United States Patent
Asao et al.

[11] Patent Number: 6,049,154
[45] Date of Patent: Apr. 11, 2000

[54] STATOR FOR VEHICLE ALTERNATOR

[75] Inventors: Yoshihito Asao; Ryoichi Taji, both of Tokyo, Japan

[73] Assignee: Mitsubishi Denki Kabushiki Kaisha, Tokyo, Japan

[21] Appl. No.: 09/135,399

[22] Filed: Aug. 18, 1998

[30] Foreign Application Priority Data

Apr. 8, 1998 [JP] Japan .................................. 10-096326

[51] Int. Cl.$^7$ ...................................................... H02K 3/04
[52] U.S. Cl. ............................................ 310/201; 29/256
[58] Field of Search .................................... 310/201, 179; 29/596, 256

[56] References Cited

U.S. PATENT DOCUMENTS

| 693,578 | 2/1902 | Wait | 310/208 |
|---|---|---|---|
| 1,843,589 | 2/1932 | Apple | 310/201 |
| 1,853,161 | 4/1932 | Apple | 310/201 |
| 2,407,935 | 9/1946 | Perfetti et al. | 310/201 |
| 3,453,468 | 7/1969 | Lund | 310/180 |
| 3,631,278 | 12/1971 | Snively | 310/158 |
| 4,001,616 | 1/1977 | Lonseth et al. | 310/45 |
| 4,307,313 | 12/1981 | Rohrer | 310/213 |
| 4,309,634 | 1/1982 | Koroly et al. | 310/201 |
| 4,857,787 | 8/1989 | Taji et al. | 310/180 |
| 5,343,613 | 9/1994 | Kintz et al. | 29/596 |
| 5,714,824 | 2/1998 | Couture et al. | 310/208 |
| 5,722,153 | 3/1998 | Holmes et al. | 29/598 |

FOREIGN PATENT DOCUMENTS

| 162 317 | 11/1985 | European Pat. Off. . |
|---|---|---|
| 59-159638 | 9/1984 | Japan . |
| 61-185045 | 8/1986 | Japan . |
| 779445 | 7/1957 | United Kingdom . |
| 1178878 | 1/1970 | United Kingdom . |

*Primary Examiner*—Nestor Ramirez
*Assistant Examiner*—Joseph Waks
*Attorney, Agent, or Firm*—Sughrue, Mion, Zinn, Macpeak & Seas, PLLC

[57] ABSTRACT

The stator includes a stator core having a plurality of slots; and a plurality of windings composed of coil units formed by winding coil strands a certain number of times and having a plurality of straight portions and coil end portions joining the ends of adjacent straight portions, the windings being incorporated into the stator core by inserting the plurality of straight portions into the slots in sequence at intervals of a certain number of slots and allowing the coil end portions to protrude axially outward from the ends of the stator core. Each coil strand has a coil shape composed such that after coming out of a slot, the strand extends in one direction around the circumference so as to be pointed axially outward and away from the end of the stator core, then doubles back towards the radially inner edge, extends in the one direction around the circumference so as to approach the end of the stator core, and enters a slot three slots away from the slot out of which the core strand came in the one direction around the circumference, and the strands are arranged so as to overlap around the circumference at the turn around portion of the coil shape and its vicinity.

4 Claims, 7 Drawing Sheets

STATOR FOR VEHICLE ALTERNATOR

BACKGROUND OF THE INVENTION

1. Field of the Invention

This invention relates to a stator for a vehicle alternator, and relates in particular to the shape of the coil end portions of the stator windings inserted into the slots of the stator core.

2. Description of the Related Art

FIG. 7 is a perspective view showing a conventional stator for a vehicle alternator, FIG. 8 is a perspective view showing the stator windings removed from a conventional stator for a vehicle alternator, and FIG. 9 is a plan schematically showing an essential part of a conventional stator for a vehicle alternator.

In each figure, a stator 1 is composed of a stator core 2 made of laminated sheet steel formed with a plurality of slots 2a, and stator windings 3 inserted into the slots 2a formed in the stator core 2. When the alternator rotor has the usual six poles, there are thirty-six slots 2a in the stator core 2.

The coil strand is inserted into every third slot 2a around the core. When one round is completed, a second round is made inserting the coil strand into the same slots 2a, and this is repeated a certain number of times to form one phase of a winding 3 according to the concentrated winding method. In a similar way, the slots 2a into which coil strands are inserted are staggered to form three phases of stator windings 3. Each of the stator windings 3 is composed of straight portions 3a which are inserted into the slots 2a, and coil end portions 3b which connect adjacent straight portions 3a at the axial ends of the stator core 2.

One phase of stator winding 3 (external winding 3A) is wound around the radially outer edge of the stator core 2, another phase of stator winding 3 (internal winding 3B) is wound around the inner edge, and the remaining phase of winding 3 (intermediate winding 3C) is wound between the other two. The shaded portion in FIG. 8 represents the external winding 3A.

Next, a description will now be made of the coil end portion of the conventional stator winding 3.

As shown in FIG. 10, each of the coil strands 4 composing the stator windings 3 rises out of a slot 2a, then bends at nearly a right angle, extends circumferentially, bends at nearly a right angle at a point above the third slot 2a away, and descends into the latter slot 2a. As shown in FIGS. 11 and 12, as each of the coil strands 4 rises out of a slot 2a, it rises up such that it overlaps the previous strands in the radial direction, bends at a different height, and descends such that it overlaps the previous strands in the radial direction again. The internal winding 3B and intermediate winding 3C are shown in abbreviated form in FIG. 12.

As described in Japanese Patent No. 4-42899 (U.S. Pat. No. 4,857,787), in stator windings constructed in this manner, coil strands 4 are wound a certain number of times to form ring-shaped coil units, and the ring-shaped coil units are formed into star-shaped coil units having straight portions 3a and coil end portions 3b. Next, each of the straight portions 3a of the star-shaped coil units is inserted into each of the slots 2a and incorporated into the stator core 2. Then, the coil end portions 3b are reshaped to certain dimensions, as shown in FIG. 12, to ensure the integrity of the generator.

FIG. 13 is a side elevation showing the vicinity of the coil end portions in another conventional stator for a vehicle alternator, and FIG. 14 is a plan schematically showing an essential part of another conventional stator for a vehicle alternator. The above conventional example explained stator windings according to the concentrated winding method; the following example will explain stator windings according to the distributed winding method.

As described in Japanese Patent No. 4-42899, in this example coil strands 4 are wound a certain number of times to form ring-shaped coil units, and the ring-shaped coil units are formed into star-shaped coil units having straight portions 3a and coil end portions 3b. Next, the star-shaped coil units are divided into two sets of distributed coil units 5a, 5b, and one set of distributed coil units 5b is inverted 180° and aligned with the other set of distributed coil units 5a and then each of the straight portions 3a is inserted into each of the slots 2a so that the stator windings are incorporated into the stator core 2. Then the coil end portions 3b are reshaped.

As shown in FIG. 14, in the stator windings 3 incorporated into the stator core 2 in this manner, the external winding 3A is wound around the radially outer edge of the stator core 2, the internal winding 3B is wound around the inner edge, and the intermediate winding 3C is wound between the other two.

As shown in FIG. 13, as each of the coil strands 4 of the distributed coil unit 5a composing each of the stator windings 3 rises out of a slot 2a, it rises up such that it overlaps the previous strands in the radial direction, then bends at nearly a right angle at a different height from the other strands, extends circumferentially in one direction, bends at nearly a right angle at a point above the third slot 2a away, and descends into the latter slot 2a. Also, as each of the coil strands 4 of the other distributed coil units 5b rises out of a slot 2a, it rises up such that it overlaps the previous strands in the radial direction, then bends at nearly a right angle at a different height from the other strands, extends circumferentially in the opposite direction, bends at nearly a right angle at a point above the third slot 2a away, and descends into the latter slot 2a.

The conventional stators for vehicle alternators arranged in the manner described above suffer from the following problems:

the position of the stator windings 3 of each phase is fixed concentrically at the outer edge, the inner edge, and between the other two, respectively, and so the coil end portions 3b of each phase line up radially and the radial dimension is enlarged;

after the stator windings 3 are incorporated into the stator core 2, they are reshaped so that as each strand rises out of a slot 2a, it rises up such that it overlaps the previous strands in the radial direction, then bends at nearly a right angle at a different height from the other strands, extends circumferentially, bends at nearly a right angle at a point above the third slot 2a away, and descends into the latter slot 2a, and so the coil strands 4 at the coil end portions 3b are subjected to unnecessary bending, rubbing, and pressure, damaging the coil coatings and giving rise to poor insulation; and the coil end portions 3b of the stator windings 3 are not aligned, and so even if they are secured with varnish, poor conditions and the passage of time cause the external winding 3A and the internal winding 3B to both spread radially.

Also, Japanese Patent No. 4-24939 describes a conventional example in which the coil strands in each phase of the coil units are staggered and arranged and disposed flatly, and in which a gap is disposed between the coil units. In this conventional example, the thickness (radial dimension) of each phase of the coil units can be reduced to a certain extent, but because there is a gap disposed between the coil units, the radial dimension of the coil ends tends to increase. In addition, the coil strands in each phase of the coil units are not aligned, giving rise to poor insulation when each phase of the coil units is reshaped.

Japanese Patent Laid Open No. 61-185045 describes a conventional example in which the coil shape of each pole of each phase is identical to every other pole of every other phase. In this conventional example, the coil units are disposed such that the each unit is staggered axially, and so the coil end portions as a whole are higher and also spread radially, and the number of points at which the coil strands are bent is greater.

SUMMARY OF THE INVENTION

The present invention has been made to solve the above-described problems, and therefore, has an object to provide a stator for a vehicle alternator in which the occurrence of poor insulation is suppressed and quality and dependability are improved by improving the alignment of the coil end portions, reducing the size of the coil end portions, and alleviating damage and deformation caused by interference between coil strands during reshaping of the coil end portions.

To achieve the above-described object, the stator for a vehicle alternator according to the present invention comprises a stator core having a plurality of slots; and a plurality of windings composed of coil units formed by winding coil strands a certain number of times and having a plurality of straight portions and coil end portions joining the ends of adjacent straight portions, the windings being incorporated into the stator core by inserting the plurality of straight portions into the slots in sequence at intervals of a certain number of slots and allowing the coil end portions to protrude axially outward from the ends of the stator core, wherein each of the coil strands composing the coil end portions has a coil shape composed such that after coming out of one of the slots, the strand extends in one direction around the circumference of the stator core so as to be pointed axially outward and away from the end of the stator core, then turns around towards the radially inner edge of the stator core, extends in the one direction around the circumference of the stator core so as to approach the end of the stator core, and enters a slot a certain number of slots away from the slot out of which the core strand came in the one direction around the circumference of the stator core, and wherein all of the coil strands composing the coil end portions of each pole of each phase are constructed such that the coil shape is almost identical and are arranged so as to overlap around the circumference of the stator core at least at the turn around portion of the coil shape and its vicinity.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described in detail.

Embodiment 1

Figure 1:
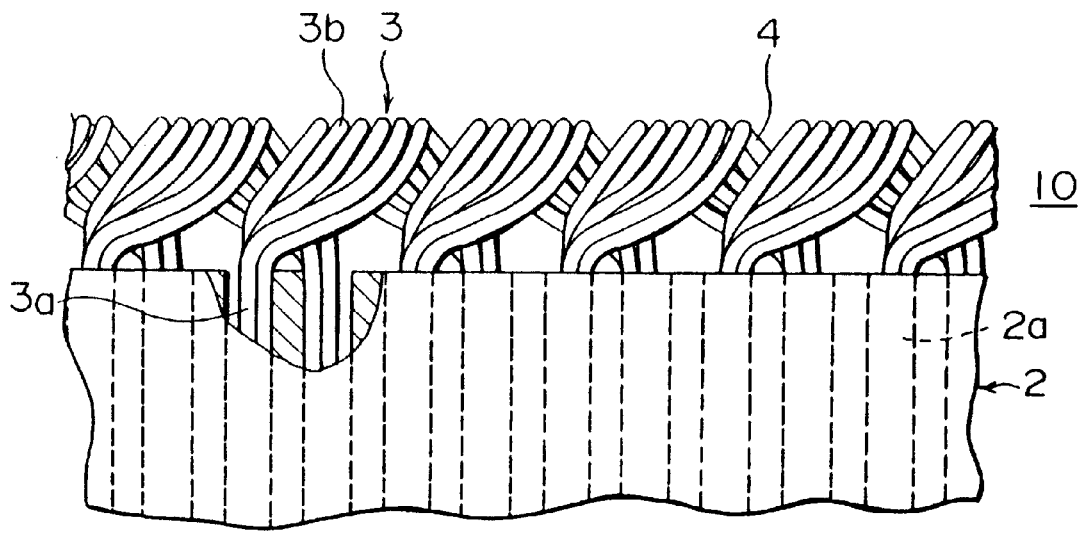
FIG. 1 is a partially sectioned side elevation showing the vicinity of the coil end portions in the stator for a vehicle alternator according to Embodiment 1 of the present invention.
Figure 2:
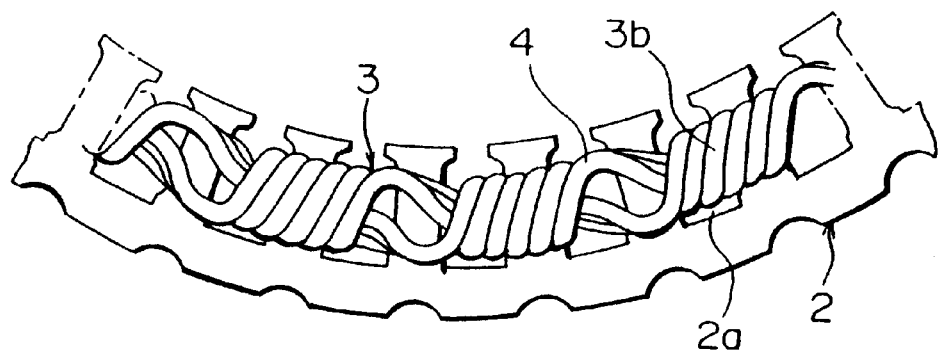
FIG. 2 is a plan showing the vicinity of the coil end portions in the stator for a vehicle alternator according to Embodiment 1 of the present invention.
Figure 3:
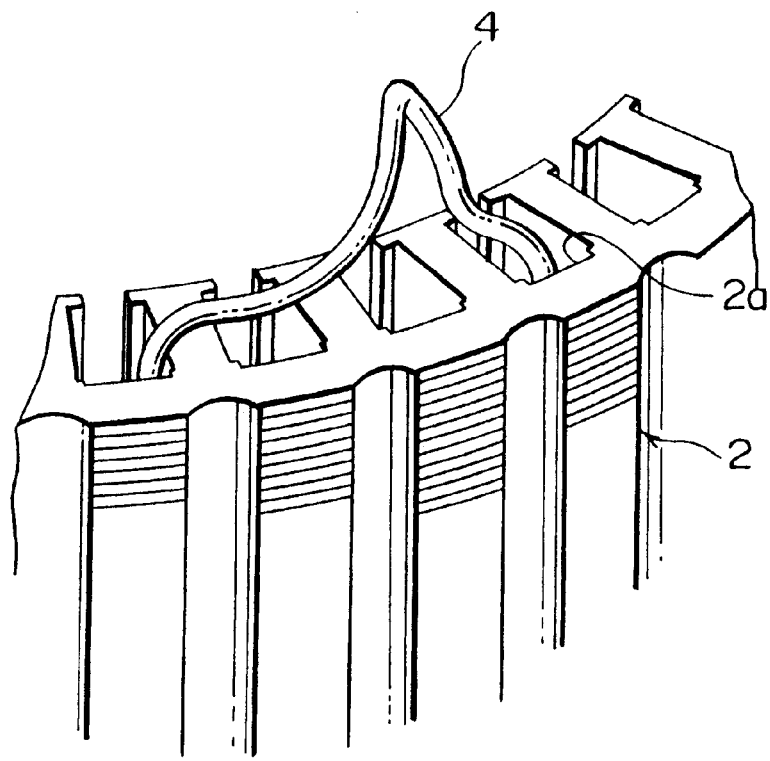
FIG. 3 is a perspective view explaining the coil shape of a single coil end portion in the stator for a vehicle alternator according to Embodiment 1 of the present invention.
Figure 4:
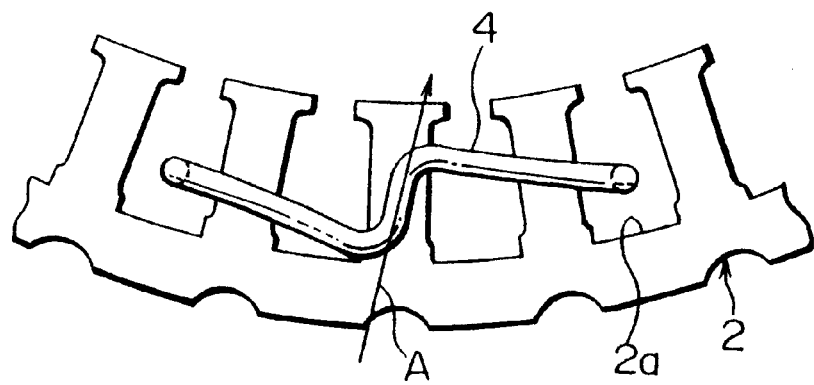
FIG. 4 is a plan explaining the coil shape of a single coil end portion in the stator for a vehicle alternator according to Embodiment 1 of the present invention.
Figure 5:
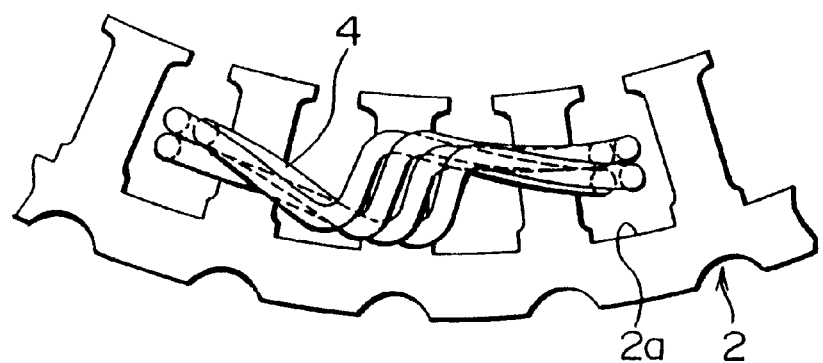
FIG. 5 is a plan explaining the coil shape of a plurality of coil end portions in the stator for a vehicle alternator according to Embodiment 1 of the present invention.

FIGS. 1 and 2 are a partially sectioned side elevation and a plan, respectively, each showing the vicinity of the coil end portions in the stator for a vehicle alternator according to Embodiment 1 of the present invention, FIGS. 3 and 4 are a perspective view and a plan, respectively, each explaining the coil shape of a single coil end portion in the stator for a vehicle alternator according to Embodiment 1 of the present invention, and FIG. 5 is a plan explaining the coil shape of a plurality of coil end portions in the stator for a vehicle alternator according to Embodiment 1 of the present invention.

In each figure, a stator 10 is composed of a stator core 2 made of laminated sheet steel formed with a plurality of slots 2a, and stator windings 3 inserted into the slots 2a formed in the stator core 2. When the alternator rotor has the usual six poles, there are thirty-six slots 2a in the stator core 2.

The coil strand 4 is inserted into every third slot 2a around the core. When one round is completed, a second round is made inserting the coil strand into the same slots 2a, and this is repeated a certain number of times to form one phase of a winding 3 according to the concentrated winding method. In a similar way, the slots 2a into which coil strands 4 are inserted are staggered to form three phases of stator windings 3. Each of the stator windings 3 is composed of straight portions 3a which are inserted into the slots 2a, and coil end portions 3b which connect adjacent straight portions 3a at the axial ends of the stator core 2.

Next, the shape of the coil end portion of a single pole of a single phase of the stator windings 3 according to the Embodiment 1 of the present invention will be explained.

As shown in FIGS. 3 and 4, each coil strand 4 composing the stator windings 3 has a coil shape composed such that after rising out of a slot 2a, the strand extends in one direction around the circumference of the stator core 2 so as to be pointed axially outward and away from the end of the stator core 2, then turns around towards the radially inner edge of the stator core 2, extends in the one direction around the circumference of the stator core 2 so as to approach the end of the stator core 2, and enters a slot 2a three slots away from the slot 2a out of which the core strand 4 came in the one direction around the circumference of the stator core 2. As shown in FIG. 5, the plurally wound coil strands 4 are arranged so as to overlap sequentially around the circumference of the stator core 2 at the turn around portion of the coil shape and its vicinity.

Furthermore, although not shown, the coil strands 4 are arranged in the same way with the same coil shape at the other end of the stator core 2. Also, as indicated by the arrow A in FIG. 4, the direction of the axis of the coil strands at the point of the turn around portion of the core shape is roughly the same as the radial direction of the stator core 2.

Now, the stator 10 is composed with every coil end portion 3b of the stator windings 3 of every phase constructed the same as the coil end portions of the single pole of the single phase mentioned above, and the coil strands 4 are arranged as shown in FIGS. 1 and 2.

In this stator 10, coil strands 4 are first wound a certain number of times to form ling-shaped coil units, and the ring-shaped coil units are formed into star-shaped coil units having straight portions 3a and coil end portions 3b. Next, each of the straight portions 3a of the star-shaped coil units is inserted into each of the slots 2a by an inserter (not shown) so that the stator windings are incorporated into the stator core 2. Then the coil end portions 3b are reshaped to certain dimensions to ensure the integrity of the generator.

According to Embodiment 1, each coil strand 4 has a coil shape composed such that after rising out of a slot 2a, the strand extends in one direction around the circumference of the stator core 2 so as to be pointed axially outward and away from the end of the stator core 2, then turns around towards the radially inner edge of the stator core 2, extends in the one direction around the circumference of the stator core 2 so as to approach the end of the stator core 2, and enters a slot 2a three slots away from the slot 2a out of which the core strand 4 came in the one direction around the circumference of the stator core 2. The coil strands 4 are joined smoothly from the base to the tip of the coil end portions without bending at nearly a right angle, and so less reshaping is required and damage to the coil strands 4 is reduced.

Also, all of the coil strands 4 composing the coil end portions 3b of every pole of every phase are constructed with an identical core shape and are arranged so as to overlap around the circumference-of the stator core 2 at the turn around portion of the coil shape, and so the alignment of the coil strands 4 in the coil end portions is improved and the height of the coil end portions reduced, reducing the amount of reshaping required, simplifying the reshaping process, and reducing damage to the coil strands 4. In addition, crossing over of coil strands 4 is reduced in every pole of every phase, so that the occurrence of damage and deformation caused by interference between coil strands 4 is suppressed. Thus, the occurrence of poor insulation between the coil strands 4 and between the coil strands 4 and the stator 2 is reduced and quality and dependability are improved.

Also, all of the coil strands composing the coil end portions 3b of every phase are constructed with an identical core shape and are arranged so as to overlap around the circumference of the stator core 2 at the turn around portion of the coil shape, and so the alignment of the coil strands 4 in the coil end portions is improved and the height of the coil end portions is uniform and reduced, reducing the amount of reshaping required, simplifying the reshaping process, and reducing damage to the coil strands 4. In addition, crossing over of coil strands 4 between phases is reduced, and so the occurrence of damage and deformation caused by interference of coil strands 4 between phases is suppressed. The occurrence of poor insulation of the coil strands 4 between phases and between the coil strands 4 and the stator is reduced and quality and dependability are improved. Moreover, the coil end portions 3b are no longer divided into external, internal, and intermediate layers as in the conventional methods, but are aligned along the circumference, and so the thickness of the coil end portions is smaller and the radial dimension can be reduced.

Also, the coil strands 4 of the coil end portions 3b are aligned, and so if they are secured with varnish, etc., radial spreading of the windings 3 can be prevented even if conditions are poor.

Also, because the direction of the axis of the coil strands 4 at the tip of the coil end portions 3b is roughly the same as the radial direction of the stator core 2, the width of the turn around portions of the coil end portions 3b along the circumference is reduced and the number of coil winds can be increased. In addition, the region in which the coil strands 4 are arranged to overlap circumferentially can be brought closer to the base of the coil end portions and so crossing of the coil strands 4 can be reduced significantly, and the occurrence of damage and deformation caused by the interference of coil strands 4 can be further suppressed.

Embodiment 2

Whereas Embodiment 1 above relates to stator windings 3 in the concentrated winding method, Embodiment 2 relates to stator windings in the distributed winding method.

In Embodiment 2, coil strands 4 are wound a certain number of times to form ring-shaped coil units, and the ring-shaped coil units are formed into star-shaped coil units having straight portions 3a and coil end portions 3b. Next, the star-shaped coil units are divided into two sets of distributed coil units 5a, 5b, and one set of distributed coil units 5b is inverted 180° and aligned with the other set of distributed coil units 5a and then each of the straight portions 3a is inserted into each of the slots 2a by an inserter (not shown) to incorporate the stator windings into the stator core 2.

Figure 6:
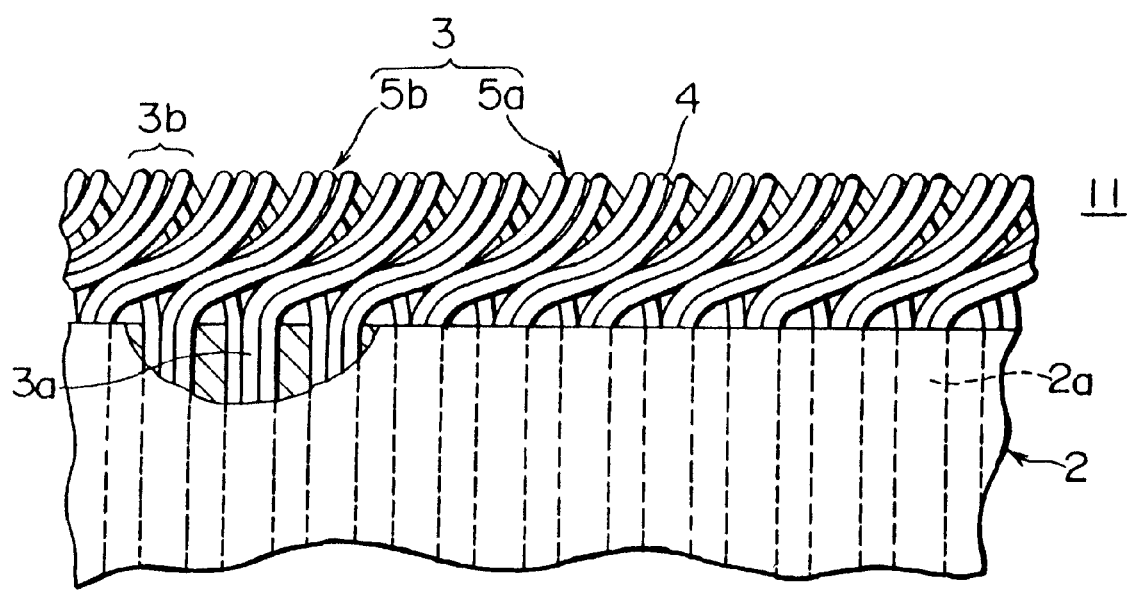
FIG. 6 is a partially sectioned side elevation showing the vicinity of the coil end portions in the stator for a vehicle alternator according to Embodiment 2 of the present invention.
Figure 7:
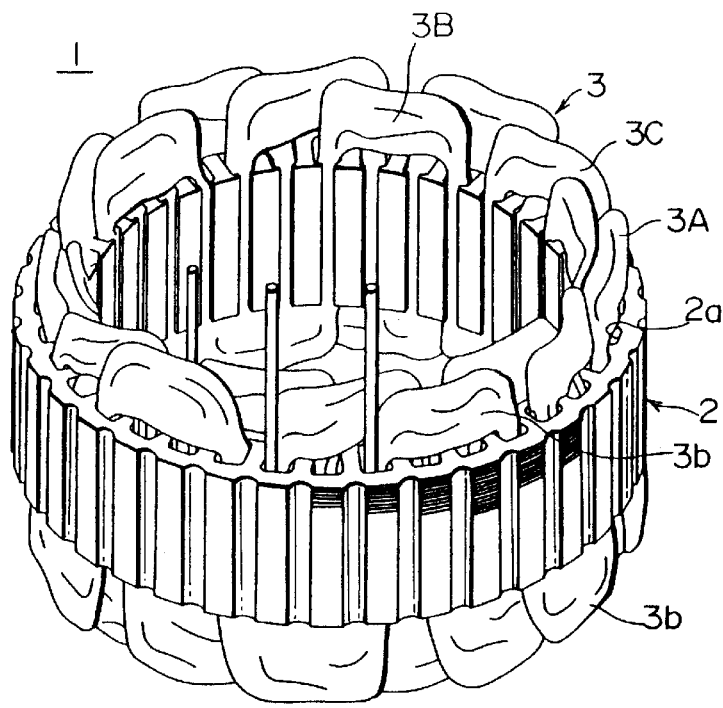
FIG. 7 is a perspective view showing a conventional stator for a vehicle alternator.
Figure 8:
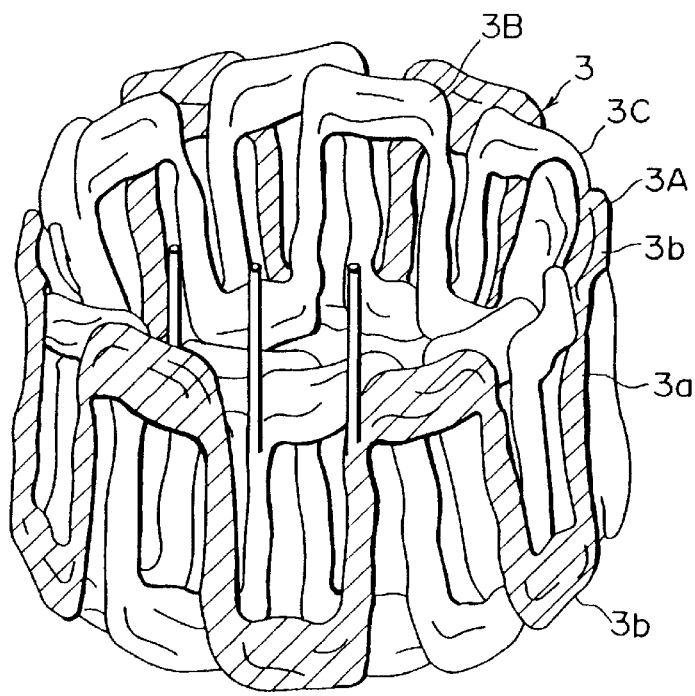
FIG. 8 is a perspective view showing the stator windings removed from a conventional stator for a vehicle alternator.
Figure 9:
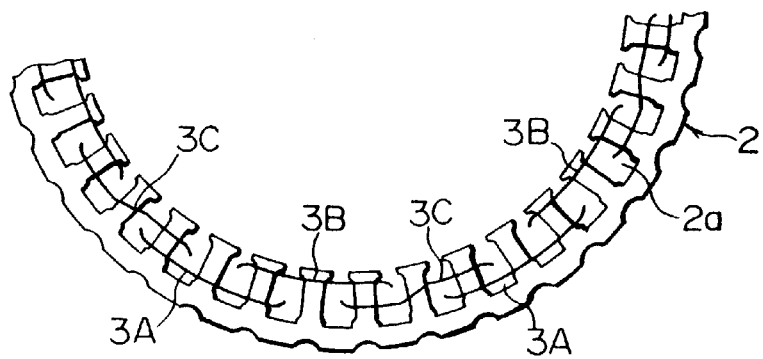
FIG. 9 is a plan schematically showing an essential part of a conventional stator for a vehicle alternator.
Figure 10:
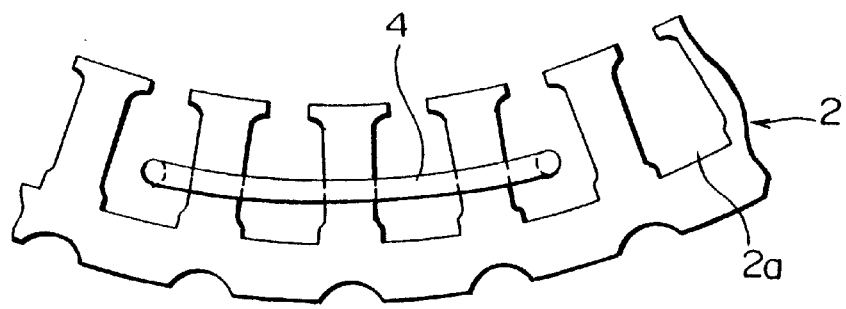
FIG. 10 is a plan explaining the coil shape of a single coil end portion in a conventional stator for a vehicle alternator.
Figure 11:
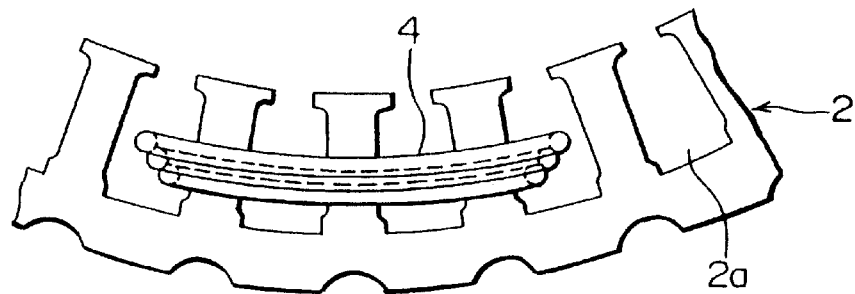
FIG. 11 is a plan explaining the coil shape of a plurality of coil end portions in a conventional stator for a vehicle alternator.
Figure 12:
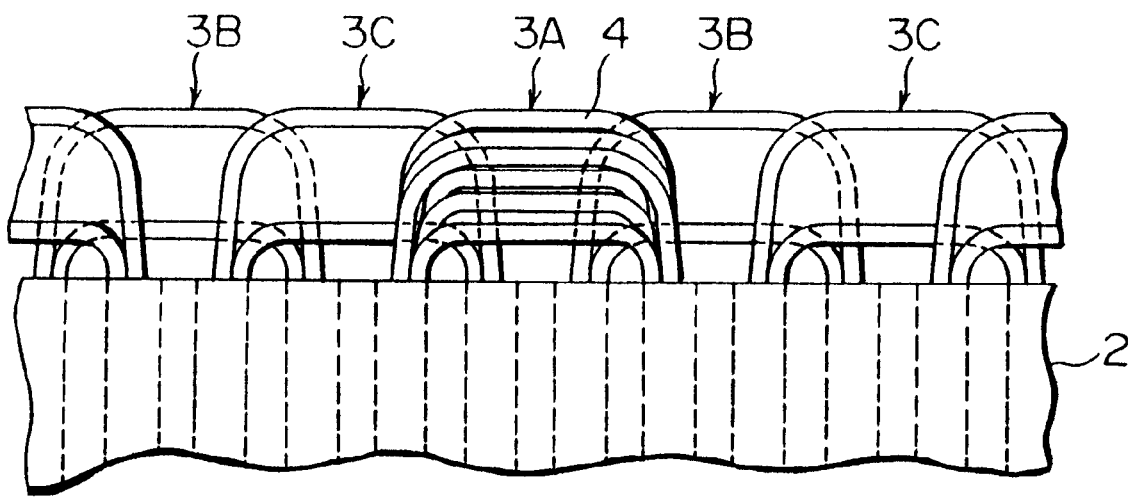
FIG. 12 is a side elevation explaining the coil shape of a plurality of coil end portions in a conventional stator for a vehicle alternator.
Figure 13:
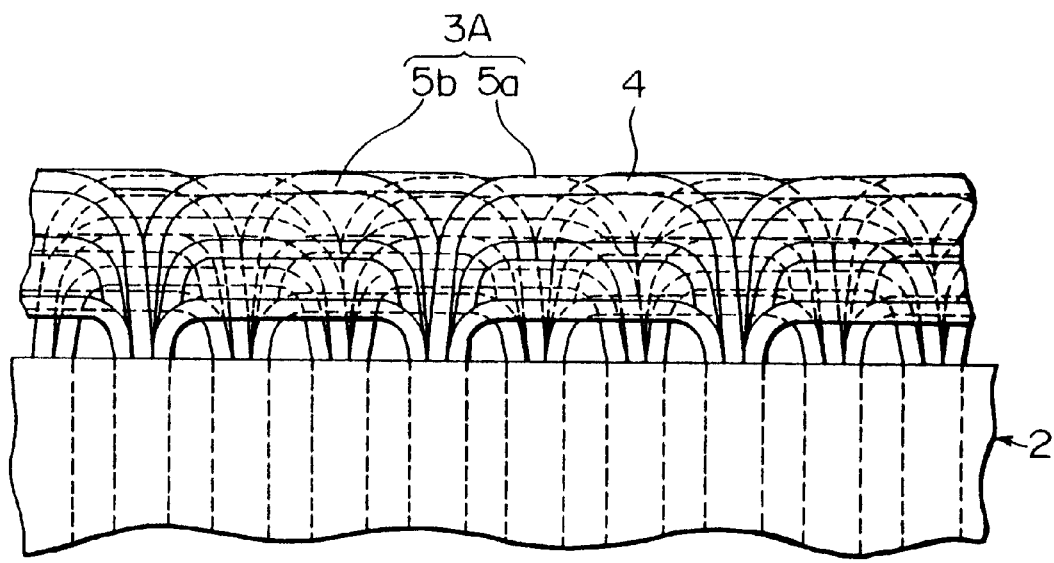
FIG. 13 is a side elevation showing the vicinity of the coil end portions in another conventional stator for a vehicle alternator.
Figure 14:
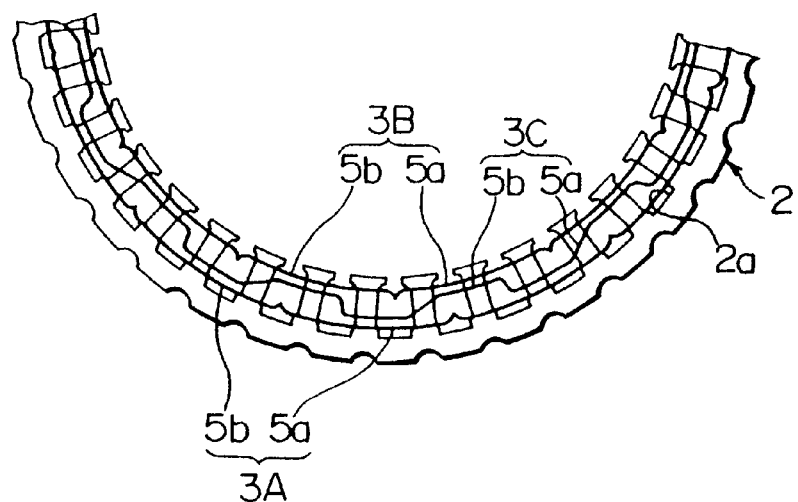
FIG. 14 is a plan schematically showing an essential part of another conventional stator for a vehicle alternator.

Next, the shape of the coil end portion of a single pole of a single phase of the stator windings 3 according to the Embodiment 2 of the present invention will be explained with reference to FIG. 6.

Each of the coil strands 4 composing the distributed coil units 5a of each of the stator windings 3 has a coil shape composed such that the strand rises out of a slot 2a, extends in one direction around the circumference of the stator core 2 so as to be pointed axially outward and away from the end of the stator core 2, then turns around towards the radially inner edge of the stator core 2, extends in the one direction around the circumference of the stator core 2 so as to approach the end of the stator core 2, and enters a slot 2a three slots away from the slot 2a out of which the core strand 4 came in the one direction around the circumference of the stator core 2. All of the coil strands 4 in the distributed coil unit 5a are arranged so as to overlap sequentially around the circumference of the stator core 2 at the turn around portion of the coil shape and its vicinity.

On the other hand, each of the coil strands 4 composing the distributed coil units 5b has a coil shape composed such that the strand rises out of a slot 2a, extends in the opposite direction around the circumference of the stator core 2 so as to be pointed axially outward and away from the end of the stator core 2, then turns around towards the radially inner edge of the stator core 2, extends in the opposite direction around the circumference of the stator core 2 so as to approach the end of the stator core 2, and enters a slot 2a three slots away from the slot 2a out of which the core strand 4 came in the opposite direction around the circumference of the stator core 2. All of the coil strands 4 in the distributed coil unit 5b are arranged so as to overlap sequentially around the circumference of the stator core 2 at the turn around portion of the coil shape and its vicinity.

Now, the stator 11 according to Embodiment 2 is constructed with the stator windings 3 mounted on the stator core 2 by the distributed winding method and with the coil end portion 3b of the stator windings 3 of every phase the same as the coil end portions of the single pole of the single phase mentioned above.

Furthermore, although not shown, the coil strands 4 are arranged in the same way with the same coil shape at the other end of the stator core 2. Also, the direction of the axis of the coil strands at the point of the turn around portion of the core shape is roughly the same as the radial direction of the stator core 2.

Also, the coil strands 4 composing the distributed coil units 5a, 5b can be seen to have identical coil shape when viewed from one direction along the circumference.

Thus, Embodiment 2 differs from Embodiment 1 in that not only is the coil shape of every single pole of every single phase identical, the positioning of the coil strands 4 with respect to each slot is also identical. Consequently, where the same number of winds is made, Embodiment 2 enables further reduction of the radial thickness of the coil end portions compared to Embodiment 1, because the coil strands 4 are distributed at the coil end portions.

Furthermore, in each of the above embodiments, the coil end portions 3b of the stator windings 3 are constructed so as to have gaps between the phases along the circumference, but gaps are not necessary between the phases of the coil end portions, and depending on the diameter of the stator core 2, and the diameter, number of windings, etc., of the coil strands 4 composing the stator windings 3, adjacent phases of coil end portions 3b may come in to contact along the circumference. Also, in each of the above embodiments, the coil strands 4 are arranged so as to come into contact with each other along the circumference at the coil end portions 3b, but it is not necessary for the coil strands 4 to be in contact with each other at the coil end portions 3b, and depending on the diameter of the stator core 2, and the diameter, number of windings, etc., of the coil strands 4 composing the stator windings 3, the coil strands 4 may be arranged so as to have gaps along the circumference.

Since the present invention has been constructed in the above-described manner, there are the below-mentioned effects.

The present invention is provided with a stator core having a plurality of slots, and a plurality of windings composed of coil units formed by winding coil strands a certain number of times and having a plurality of straight portions and coil end portions joining the ends of adjacent straight portions, incorporated into the stator core by inserting the plurality of straight portions into the slots in sequence at intervals of a certain number of slots and allowing the coil end portions to protrude axially outward from the ends of the stator core, wherein each of the coil strands composing the coil end portions has a coil shape composed such that after coming out of one of the slots, the strand extends in one direction around the circumference of the stator core so as to be pointed radially outward and away from the end of the stator core, then turns around towards the radially inner edge of the stator core, extends in the one direction around the circumference of the stator core so as to approach the end of the stator core, and enters a slot a certain number of slots away from the slot out of which the core strand came in the one direction around the circumference of the stator core, and wherein all of the coil strands composing the coil end portions of each pole of each phase are constructed such that the coil shape is almost identical and are arranged so as to overlap around the circumference of the stator core at least at the turn around portion of the coil shape and its vicinity. Thus, a stator for a vehicle alternator is obtained in which the occurrence of poor insulation is suppressed and quality and dependability are improved by improving the alignment of the coil end portions, reducing the size of the coil end portions, and alleviating damage and deformation caused by interference between coil strands during reshaping of the coil end portions.

Also, all of the coil strands composing the coil end portions of every phase may be constructed such that the coil shape is almost identical and may be arranged so as to overlap around the circumference of the stator core at least at the turn around portion of the coil shape and its vicinity, and so the alignment of the coil end portions is improved, and the stator windings of every phase are arranged around the circumference so that the radial dimension can be reduced.

Also, the direction of the shaft of the coil strands at the point of the turn around portion of the core shape may be roughly the same as the radial direction of the stator core, and so the region in which the coil strands are arranged to overlap circumferentially can be brought closer to the base of the coil end portions and so crossing of the coil strands can be reduced significantly.

What is claimed is:

1. A stator for a vehicle alternator comprising:

a stator core having a plurality of slots and two ends; and a plurality of windings composed of coil units formed by winding coil strands a predetermined number of times around said stator core, each of said windings having a plurality of straight portions having ends and corresponding coil end portions, said coil end portions joining the ends of said corresponding straight portions, said windings being incorporated into said stator core by inserting said plurality of straight portions into said slots in sequence at intervals of a predetermined number of slots and allowing said coil end portions to protrude axially outward from ends of said stator core, wherein each of the coil strands has a coil shape composed such that after exiting of one of said slots, each of said strands extends in one direction around a circumference of said stator core then points axially outward and away from one of said ends of said stator core, then turns back around towards a radially inner edge of said stator core, then extends in said one direction around the circumference of said stator core, and enters another of said slots a predetermined number of slots away from said one of said slots out of which each of said coil strands exited from said stator core, and wherein all of the coil strands of each pole of each phase are constructed such that said coil shape is substantially identical and said coil strands are arranged so as to overlap around the circumference of said stator core at least at a portion of said coil shape and its vicinity where each said coil strand turns back around toward said stator core.

2. The stator for a vehicle alternator according to claim 1, wherein a direction of an axis of said coil strands at the portion where said coil strands turn back around is substantially a radial direction of said stator core.

3. The stator for a vehicle alternator according to claim 1, wherein all of said coil strands composing each phase are constructed such that said coil shape is substantially identical and are arranged so as to overlap around the circumference of said stator core at least at the portion of said coil shape and its vicinity where said coil strands turn back around toward said stator core.

4. The stator for a vehicle alternator according to claim 3, wherein a direction of an axis of said coil strands at the portion where said coil strands turn back around is substantially a radial direction of said stator core.

* * * * *